(12) United States Patent  
Kikuhara et al.

(10) Patent No.: US 7,864,651 B2  
(45) Date of Patent: Jan. 4, 2011

(54) OPTICAL PICKUP AND OPTICAL DISK APPARATUS

(75) Inventors: Hajime Kikuhara, Chiba (JP); Kazumi Kobayashi, Tokyo (JP)

(73) Assignee: Sony Corporation, Tokyo (JP)

( * ) Notice: Subject to any disclaimer, the term of this patent is extended or adjusted under 35 U.S.C. 154(b) by 327 days.

(21) Appl. No.: 12/123,118

(22) Filed: May 19, 2008

(65) Prior Publication Data

US 2008/0304394 A1 Dec. 11, 2008

(30) Foreign Application Priority Data

Jun. 11, 2007 (JP) ............................. 2007-154276

(51) Int. Cl.
*G11B 7/135* (2006.01)

(52) U.S. Cl. ................................. 369/112.16

(58) Field of Classification Search ............ 369/112.19, 369/110.02, 110.04, 112.16, 112.17, 112.21
See application file for complete search history.

(56) References Cited

U.S. PATENT DOCUMENTS 7,197,003 B2  3/2007 Hirai et al.

2003/0021220 A1 * 1/2003 Yamauchi et al. ........... 369/249  
2005/0036432 A1 * 2/2005 Kim et al. ............... 369/112.16  
2005/0111516 A1 * 5/2005 Hatano et al. ............... 372/106

FOREIGN PATENT DOCUMENTS

JP 2003-98350 4/2003

\* cited by examiner

*Primary Examiner*—Joseph H Feild  
*Assistant Examiner*—Nicholas Lee  
(74) *Attorney, Agent, or Firm*—Oblon, Spivak, McClelland, Maier & Neustadt, L.L.P.

(57) ABSTRACT

An optical pickup includes: a first light source that emits a first linearly polarized light beam; a second light source that emits a second linearly polarized light beam different from the first wavelength; a drive unit configured to selectively drive the light sources; a first light path along which the first light beam travels to an optical disk; a second light path along which the second light beam travels to the optical disk, the first and second light paths intersecting in the middle of the light paths and are combined into a third light path; a light path-combining optical element provided at the intersection of the first and second light paths; a light path-separating optical element provided along the third light path; a phase difference-imparting optical element provided along the third light path; and a light receiving element that receives the first and second light beams reflected off the optical disk.

13 Claims, 8 Drawing Sheets

OPTICAL PICKUP AND OPTICAL DISK APPARATUS

CROSS REFERENCES TO RELATED APPLICATIONS

The present invention contains subject matter related to Japanese Patent Application JP 2007-154276 filed in the Japanese Patent Office on Jun. 11, 2007, the entire contents of which being incorporated herein by reference.

BACKGROUND OF THE INVENTION

1. Field of the Invention

The present invention relates to an optical pickup that uses a plurality of light beams having different wavelengths to record and reproduce a signal to and from an optical disk, and an optical disk apparatus including such an optical pickup.

2. Description of the Related Art

At present, there are commercially available optical disks, such as a CD, a DVD (Digital Versatile Disk), and a BD (Blu-ray Disk), on which recording and/or reproduction is performed by using light beams having wavelengths different from one another, and optical pickups by which such different types of optical disks can be handled.

The optical system of such an optical pickup includes a plurality of light sources of different wavelengths, a light path-combining optical element that directs the light beam emitted from each of the light sources through a single light path to the optical disk, and an optical isolator that directs the light beam to the optical disk and directs the reflected light beam reflected off the optical disk to a light receiving element.

In recent years, a configuration in which a phase shifting mirror as such an optical isolator is combined with a beam splitter has been proposed (see JP-A-2003-98350), the phase shifting mirror having a function similar to a quarter-wave plate by forming a phase shifting film on an upward-folding mirror disposed immediately upstream of an objective lens.

SUMMARY OF THE INVENTION

To impart a phase difference exactly corresponding to a quarter of the wavelength to a linearly polarized light beam reflected off a phase shifting mirror, it is necessary to accurately incline the polarization direction of the linearly polarized light incident on the phase shifting mirror by a predetermined angle (45 degrees, for example). It is therefore necessary to incline each of the light sources by the predetermined angle with respect to the phase shifting mirror around the optical axis of the light beam emitted from the light source.

On the other hand, the light path-combining optical element imparts phase difference to a linearly polarized light beam passing through or reflected off the light path-combining optical element due to the phase difference of the optical element itself when the polarization direction of the light beam passing through or reflected off the optical element is deviated from the polarization direction of P-polarized or S-polarized light, that is, when the polarization direction of the light beam is inclined by the predetermined angle.

When the light beam to which such a phase difference has been imparted is incident on the phase shifting mirror, the light beam reflected off the phase shifting mirror becomes elliptically polarized light instead of circularly polarized light. The optical isolator does not therefore perform light separation adequately, and the resultant return light to the light source disadvantageously generates noise in the light beam emitted from the light source or reduces the amount of light to be directed to the optical disk. Such noise generation and reduction in the amount of light are disadvantageous in improving the performance of the optical disk.

Thus, it is desirable to provide an optical pickup and an optical disk apparatus that are advantageous in improving the performance thereof.

According to an embodiment of the invention, there is provided an optical pickup including a first light source that emits a first linearly polarized light beam having a first wavelength; a second light source that emits a second linearly polarized light beam having a second wavelength different from the first wavelength; a drive means for selectively driving the first and second light sources; a first light path along which the first light beam emitted from the first light source travels to an optical disk; a second light path along which the second light beam emitted from the second light source travels to the optical disk, the first and second light paths intersecting somewhere in the middle of the light paths and are combined into a third light path that extends from the intersection to the optical disk; a light path-combining optical element provided at the intersection of the first and second light paths; a light path-separating optical element provided along the third light path, the light path-separating optical element reflecting light with a predetermined reflectance and transmitting light with a predetermined transmittance; a phase difference-imparting optical element provided along the third light path between the light path-separating optical element and the optical disk, the phase difference-imparting optical element imparting a predetermined phase difference to the first and second light beams; and a light receiving element that receives the first and second light beams reflected off the optical disk, guided by the phase difference-imparting optical element, and transmitted through the light path-separating optical element, the polarization direction of each of the first and second light beams incident on the phase difference-imparting optical element having an intermediate angle between the angles of the polarization directions of P-polarized and S-polarized light, wherein the first and second light sources and the light path-combining optical element are disposed in such a way that each of the first and second light beams incident on the light path-combining optical element is P-polarized or S-polarized light.

According to another embodiment of the invention, there is provided an optical disk apparatus including a drive means for holding and rotating an optical disk, and an optical pickup that applies recording and/or reproducing light beams to the optical disk rotated by the drive means and detecting a reflected light beam reflected off the optical disk, wherein the optical pickup includes a first light source that emits a first linearly polarized light beam having a first wavelength, a second light source that emits a second linearly polarized light beam having a second wavelength different from the first wavelength, a drive means for selectively driving the first and second light sources, a first light path along which the first light beam emitted from the first light source travels to the optical disk, a second light path along which the second light beam emitted from the second light source travels to the optical disk, the first and second light paths intersecting somewhere in the middle of the light paths and are combined into a third light path that extends from the intersection to the optical disk, a light path-combining optical element provided at the intersection of the first and second light paths, a light path-separating optical element provided along the third light path, the light path-separating optical element reflecting light with a predetermined reflectance and transmitting light with a predetermined transmittance, a phase difference-imparting optical element provided along the third light path between the light path-separating optical element and the optical disk, the phase difference-imparting optical element imparting a predetermined phase difference to the first and second light beams, and a light receiving element that receives the first and second light beams reflected off the optical disk, guided by the phase difference-imparting optical element, and transmitted through the light path-separating optical element, the polarization direction of each of the first and second light beams incident on the phase difference-imparting optical element having an intermediate angle between the angles of the polarization directions of P-polarized and S-polarized light, and the first and second light sources and the light path-combining optical element disposed in such a way that each of the first and second light beams incident on the light path-combining optical element is P-polarized or S-polarized light.

According to another embodiment of the invention, since the first and second light beams are P-polarized or S-polarized with respect to the light path-combining optical element, no phase difference is imparted to the light beam incident on the light path-combining optical element. Therefore, the phase difference-imparting optical element reliably performs linear-to-circular and circular-to-linear polarization conversion, so that the polarization direction of each of the light beams emitted from the first and second light sources is reliably 90 degrees apart from the polarization direction of the return light. Such polarization direction relationship is advantageous in effectively reducing return light-induced noise generated in the first and second light sources.

DESCRIPTION OF THE PREFERRED EMBODIMENTS

First Embodiment

An Embodiment of the invention will be described below.

First, an optical disk apparatus into which an optical pickup according to an embodiment of the invention is incorporated will be described.

Figure 1:
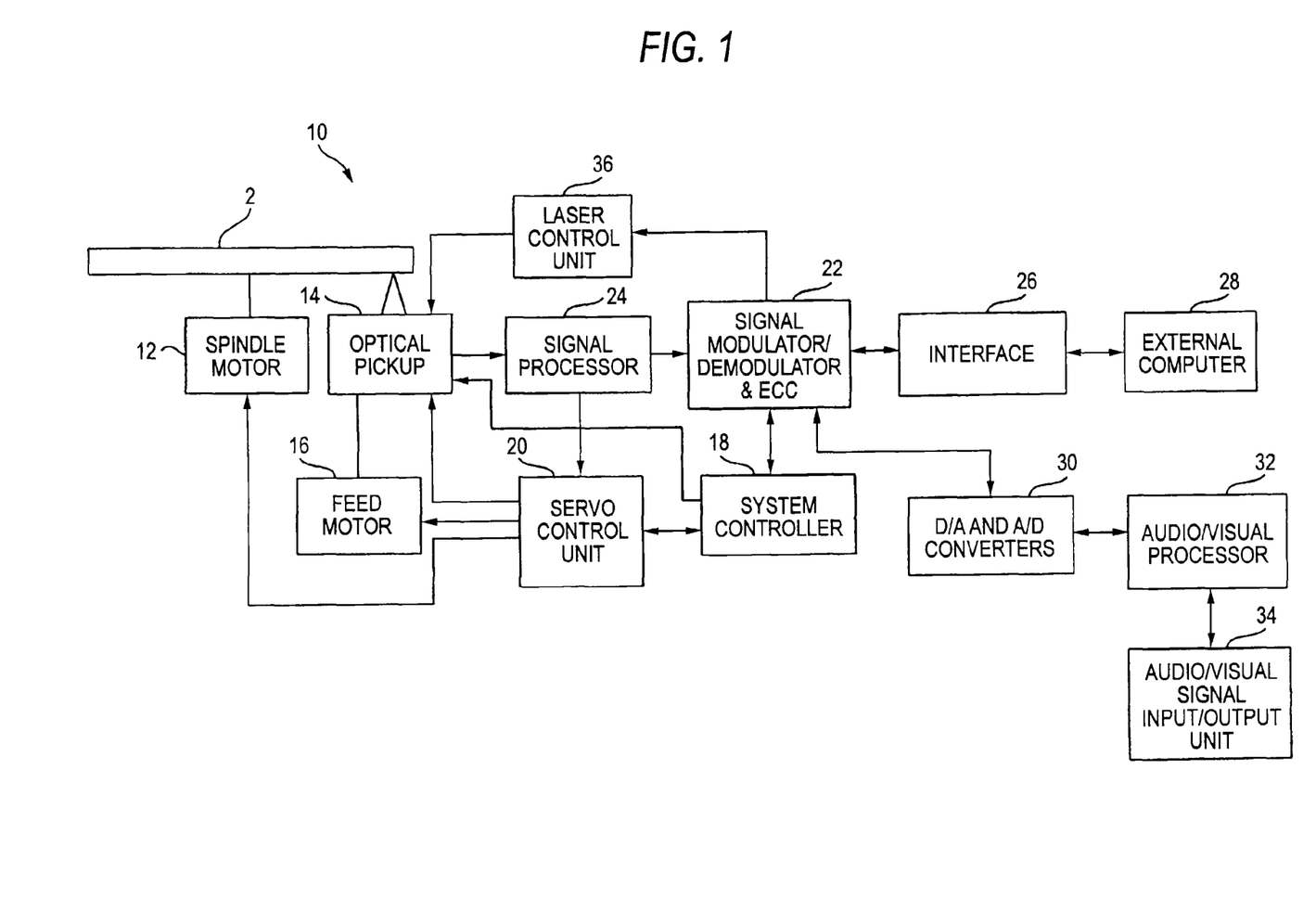
FIG. 1 is a block diagram showing the configuration of an optical disk apparatus 10 of a first embodiment.

FIG. 1 is a block diagram showing the configuration of an optical disk apparatus 10 into which an optical pickup 14 of a first embodiment is incorporated.

As shown in FIG. 1, the optical disk apparatus 10 includes a spindle motor 12 as a driving means for rotating an optical disk 2, the optical pickup 14, and a translating motor 16 as a driving means for moving the optical pickup 14 in its radial direction. The spindle motor 12 is driven and controlled at a predetermined rotational speed by a system controller 18 and a servo control unit 20.

A signal modulator/demodulator and ECC block 22 modulates and demodulates a signal outputted from a signal processor 24 and adds an ECC (error correction code) to the signal. The optical pickup 14 applies a light beam to a signal recording surface of the optical disk 2 that rotates according to commands from the system controller 18 and the servo control unit 20. By thus applying light, an optical signal is recorded and reproduced to and from the optical disk 2.

The optical pickup 14 detects various kinds of light beams based on the reflected light beam from the signal recording surface of the optical disk 2, and supplies signals corresponding to the light beams to the signal processor 24.

In this embodiment, the optical pickup 14 performs recording and/or reproduction on multiple types of optical disks 2, such as a CD, a DVD, and a BD, for which light beams having different wavelengths are used.

The signal processor 24 produces servo control signals based on the detection signals corresponding to the light beams, that is, a focus error signal, a tracking error signal, an RF signal, a monitor signal necessary for a running OPC-process (R-OPC signal), and an ATIP signal necessary to rotate the optical disk during recording, which will be described later. Further, according to the type of the recording medium to be reproduced, the servo control unit 20, the signal modulator and ECC block 22, and the like are used to carry out predetermined processes, such as demodulation and error correction, based on the signals described above.

When the recorded signal demodulated in the signal modulator and ECC block 22 is, for example, a signal for computer data storage, the signal is sent through an interface 26 to an external computer 28 or the like. The external computer 28 or the like thus receives the signal recorded on the optical disk 2 as a reproduced signal.

When the recorded signal demodulated in the signal modulator and ECC block 22 is a signal for audio/visual purposes, the signal is digital/analog-converted in the D/A converter in a D/A and A/D converters 30 and supplied to an audio/visual processor 32. Then, the audio/visual processor 32 performs audio/video signal processing, and the result is sent through an audio/visual signal input/output unit 34 to an external imager/projector.

The optical pickup 14 is connected to the translation motor 16, and the rotation of the translation motor 16 moves the optical pickup 14 to a predetermined recording track on the optical disk 2.

The servo control unit 20 controls not only the spindle motor 12 and the translation motor 16, but also an objective lens 60 (FIG. 2) in the optical pickup 14 in the focusing direction and the tracking direction based on the focus error signal and the tracking error signal. The servo control unit 20 further controls radial skew.

Figure 2:
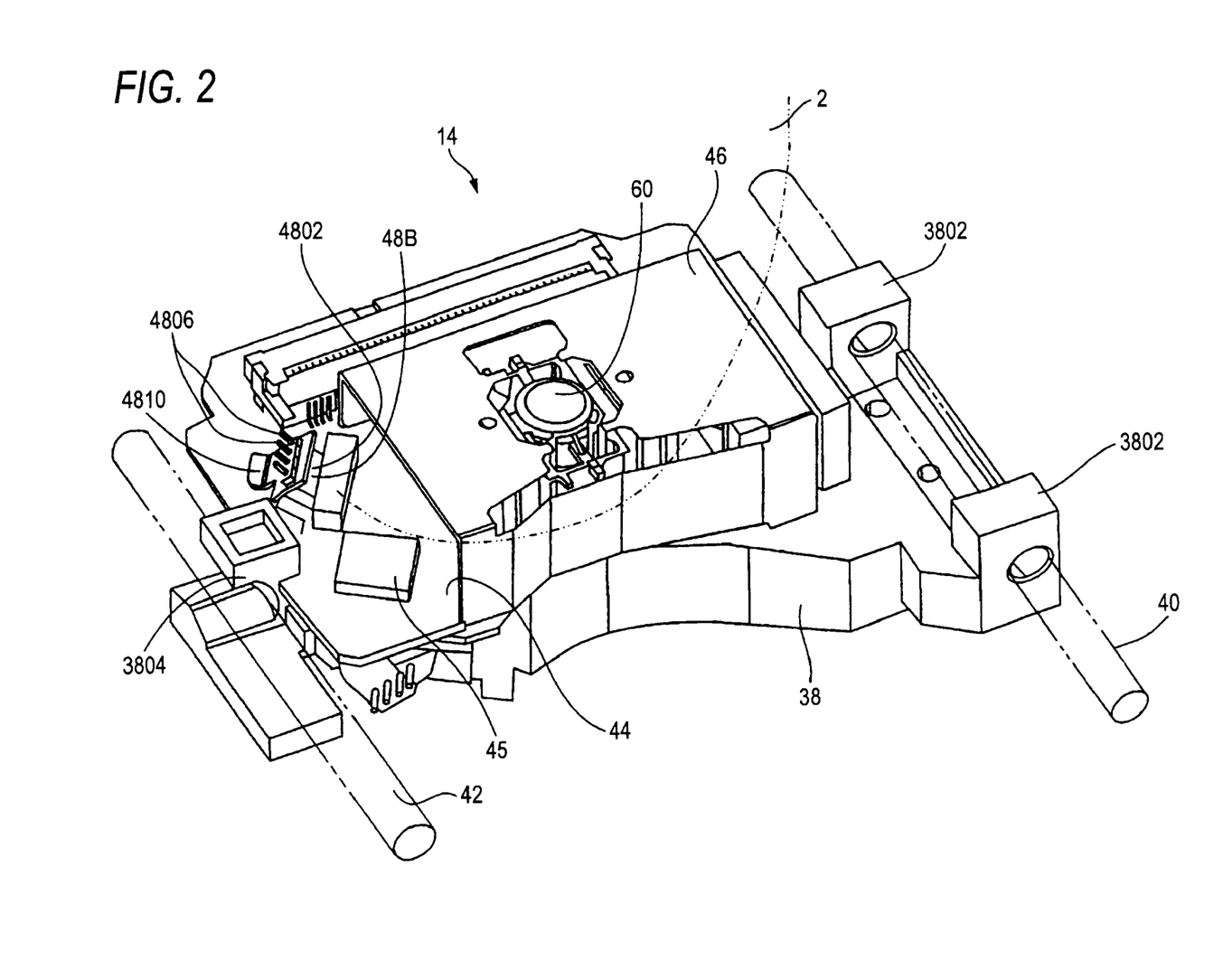
FIG. 2 is a perspective view showing the configuration of an optical pickup 14.

A laser control unit 36 controls a laser light source in the optical pickup 14. In this embodiment, the laser control unit 36 controls first and second light sources 48A and 48B as will be described later, and includes a driver 45 (FIG. 2). In other words, the laser control unit 36 forms a driving means for selectively driving the first and second light sources 48A and 48B.

Next, the optical pickup 14 of this embodiment will be described.

FIG. 2 is a perspective view showing the configuration of the optical pickup 14.

As shown in FIG. 2, on a frame that forms an enclosure of the optical disk apparatus 10, a primary guide shaft 40 and a secondary guide shaft 42 are provided parallel to each other with a distance therebetween in a plane parallel to the recording surface of the optical disk 2.

The optical pickup 14 includes a plate-like slide base 38. The primary guide shaft 40 and the secondary guide shaft 42 are inserted through bearings 3802 and 3804 provided at both ends of the slide base 38, so that the slide base 38 is slidably supported in the radial direction of the optical disk 2.

A substrate 44 on which electronic parts, such as the driver 45 for driving the first and second light sources 48A and 48B (FIG. 3), and a housing 46 are assembled on the upper surface of the slide base 38 that faces the optical disk 2.

In other words, the substrate 44 is disposed between the first light source 48A, which will be described later, and the optical disk 2.

An optical system 15 (FIG. 3) of the optical pickup 14 is assembled on the slide base 38 and in the housing 46.

The objective lens 60, which will be described later, in the optical system 15 is disposed in such a way that it faces the optical disk 2 through an opening of the housing 46.

Figure 3:
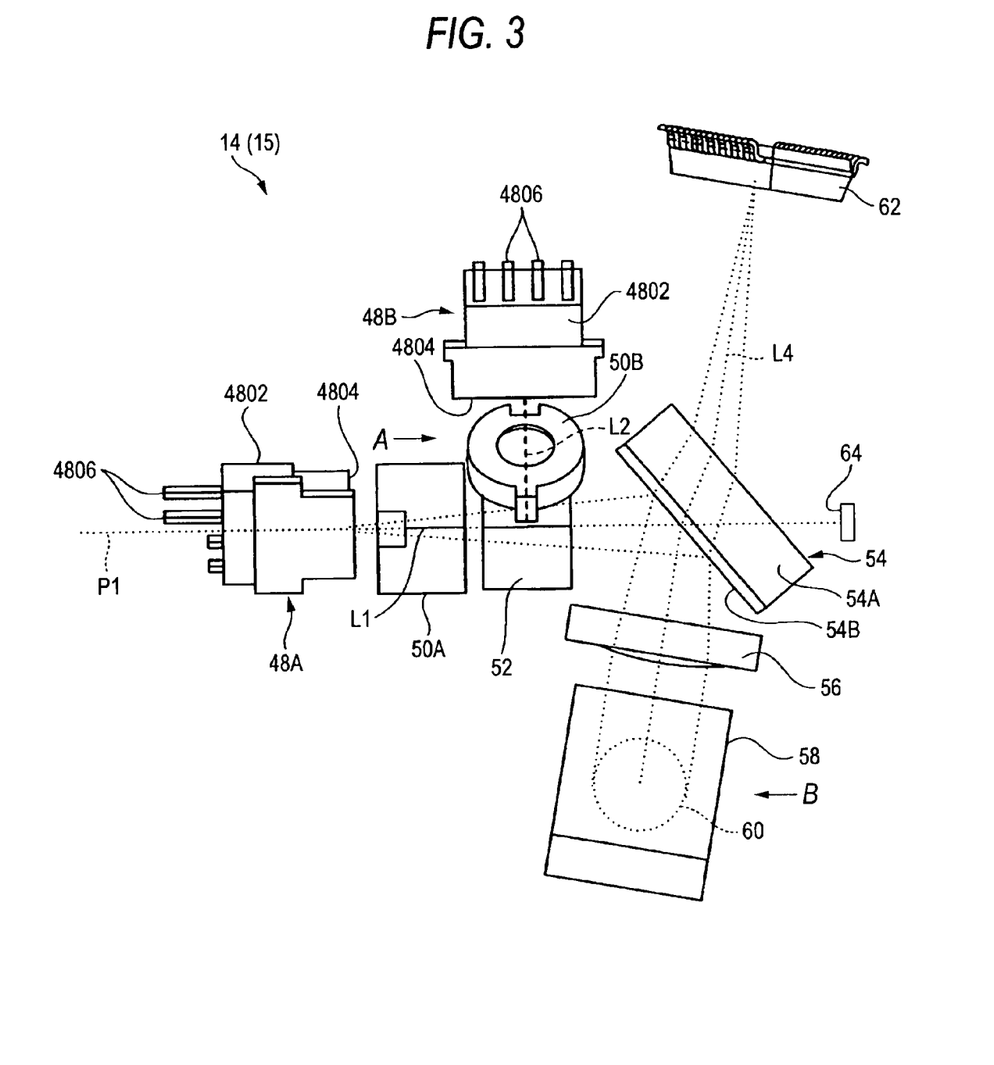
FIG. 3 is the plan view of an optical system 15 of the optical pickup 14 viewed from an optical disk 2 side.
Figure 4:
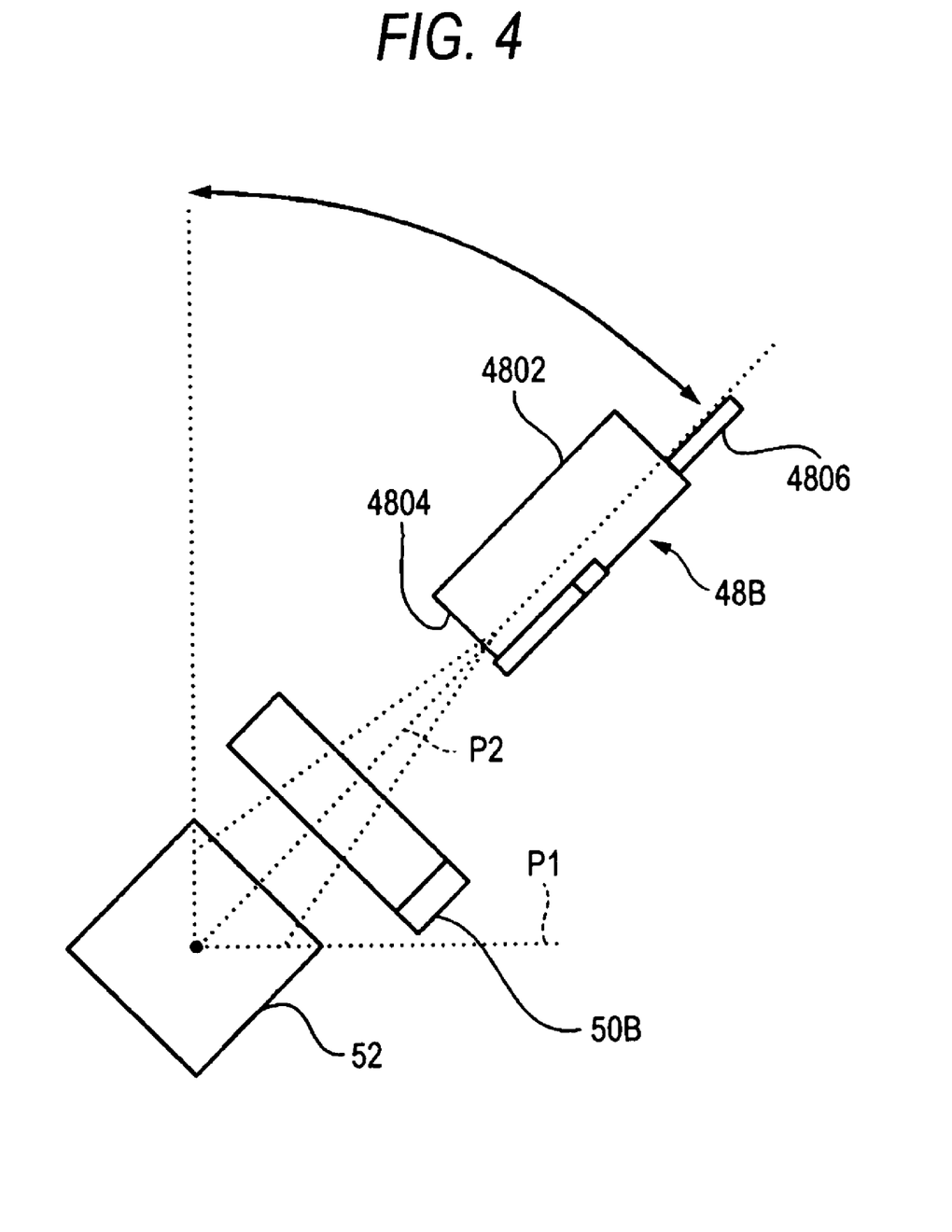
FIG. 4 is a side view of the optical system 15 viewed in the direction indicated by the arrow A in FIG. 3.
Figure 5:
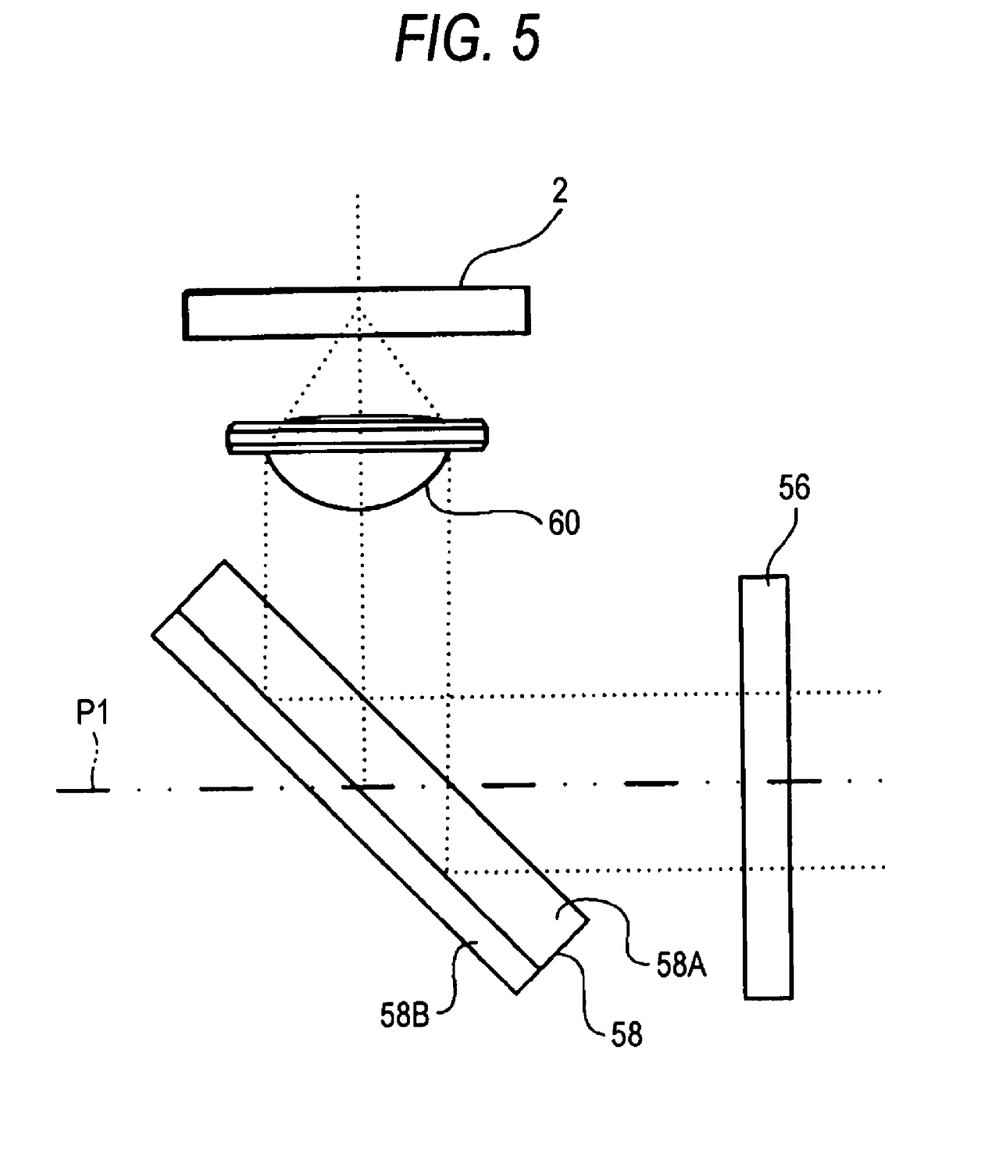
FIG. 5 is a side view of the optical system 15 viewed in the direction indicated by the arrow B in FIG. 3.

FIG. 3 is the plan view of the optical system 15 of the optical pickup 14 viewed from the optical disk 2 side. FIG. 4 is a side view of the optical system 15 viewed in the direction indicated by the arrow A in FIG. 3. FIG. 5 is a side view of the optical system 15 viewed in the direction indicated by the arrow B in FIG. 3.

As shown in FIGS. 3, 4, and 5, the optical system 15 of the optical pickup 14 includes the first and second light sources 48A and 48B, first and second diffraction gratings 50A and 50B, a dichroic prism 52, a beam splitter plate 54, a collimator lens 56, a phase shifting mirror 58, the objective lens 60, and a PDIC 62.

The first and second light sources 48A and 48B emit linearly polarized light beams having wavelengths different from each other. In other words, the first light source 48A emits a first linearly polarized light beam having a first wavelength, and the second light source 48B emits a second linearly polarized light beam having a second wavelength different from the first wavelength.

In this embodiment, each of the first and second light sources 48A and 48B is formed of a semiconductor laser. The first light source 48A emits, as the first light beam, a light beam having a wavelength for CD, and the second light source 48B emits, as the second light beam, a light beam having a wavelength for DVD, which is shorter than the wavelength of the first light beam. Alternatively, the first light source 48A may emit, as the first light beam, a light beam having a wavelength for BD, and the second light source 48B may emit, as the second light beam, a light beam having a wavelength for CD and DVD, which is longer than the wavelength of the first light beam. Further, the first and second light sources 48A and 48B may be interchanged in terms of position. That is, the wavelengths and the positions of the first and second light sources 48A and 48B are arbitrarily selected.

Each of the first and second light sources 48A and 48B has a rectangular plate-like package 4802 that houses and holds a laser diode chip, and the package 4802 has a certain thickness, a width greater than the thickness, and a length greater than the width.

The side of the package 4802 that is located at one end thereof in the longitudinal direction is an exit surface 4804 through which the light beam exits.

A plurality of connection terminals 4806 are provided on the side located at the other end of the package 4802 in the longitudinal direction. The connection terminals 4806 jut out from the side and arranged at regular intervals in the width direction.

The connection terminals 4806 are electrically connected to the driver 45 via a flexible substrate 4810 and the substrate 44 as shown in FIG. 2.

Each of the first and second light sources 48A and 48B is driven by drive signals supplied from the driver 45 to the connection terminals 4806, and the light beam is emitted through the exit surface 4804.

In this embodiment, the polarization direction of the linearly polarized light emitted from each of the first and second light sources 48A and 48B is oriented parallel to the width direction of the package 4802.

The first and second light sources 48A and 48B are assembled on the slide base 38.

Figure 8:
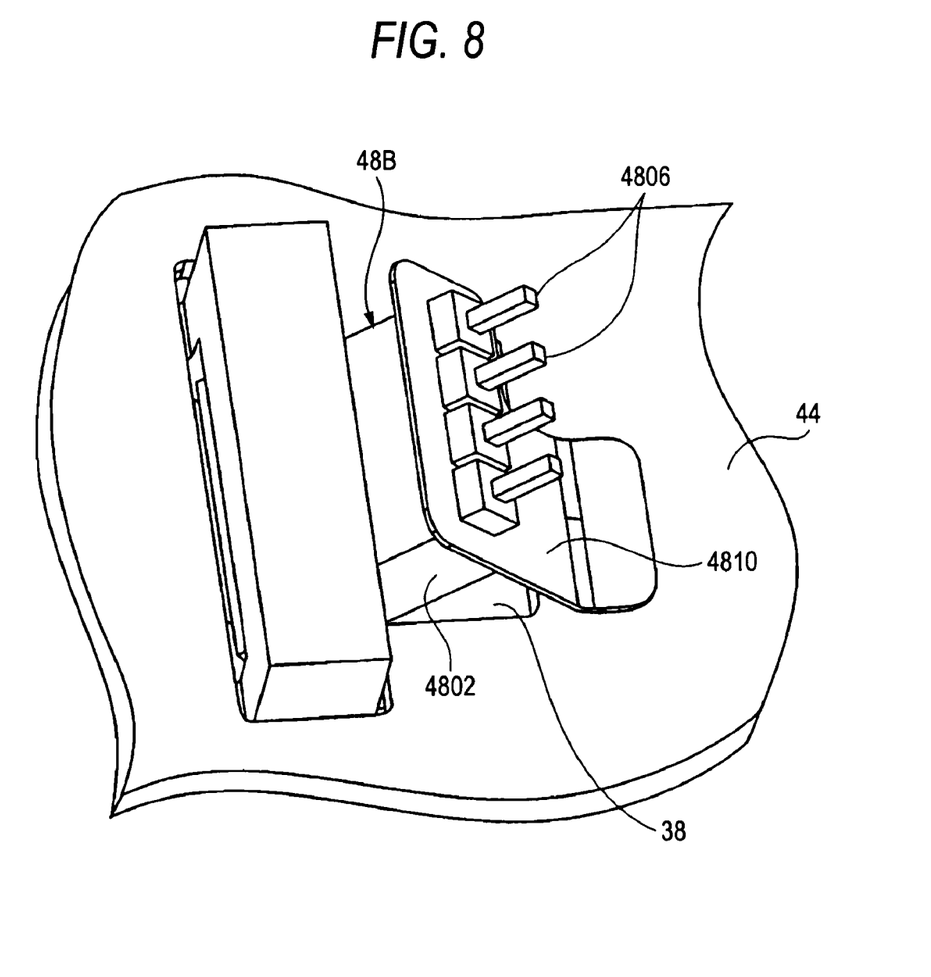
FIG. 8 is a perspective view showing how the second light source 48B is attached.

As shown in FIG. 8, the second light source 48B, specifically, the portion of the package 4802 that is close to the exit surface 4804 is held by the slide base 38 in such a way that the connection terminals 4806 and the portion of the package 4802 that is close to the connection terminals 4806 jut out through the opening of the substrate 44 toward the optical disk 2 and face the optical disk 2. In other words, the second light source 48B is configured in such a way that the connection terminals 4806 are disposed on the portion of the package 4802 that is opposite to the exit surface 4804, and the connection terminals 4806 and the portion of the package 4802 that is close to the connection terminals 4806 are located in a region close to the optical disk 2 and face the optical disk 2.

Therefore, the second light source 48B is disposed in such a way that air flow generated when the optical disk 2 rotates impinges on the package 4802 and the connection terminals 4806. Further, as shown in FIG. 2, the second light source 48B is disposed in a region close to the driver 45.

As shown in FIGS. 3 to 5, there are a first light path along which the first light beam emitted from the first light source 48A travels to the optical disk 2 and a second light path along which the second light beam emitted from the second light source travels to the optical disk 2.

Further, the first and second light paths intersect somewhere in the middle of the light paths and are combined into a third light path that extends from the intersection to the optical disk 2. The dichroic prism 52, which forms a light path-combining optical element, is disposed at the intersection of the first and second light paths.

In this embodiment, the optical axis of the portion of the first light path along which the first light beam emitted from the first light source 48A travels to the dichroic prism 52 is perpendicular to the optical axis of the portion of the second light path along which the second light beam emitted from the second light source 48B travels to the dichroic prism 52.

The intersection angle between the optical axis of the portion of the first light path along which the first light beam emitted from the first light source 48A travels to the dichroic prism 52 and the optical axis of the portion of the second light path along which the second light beam emitted from the second light source 48B travels to the dichroic prism 52 may be a right angle or any predetermined angle. That is, the intersection angle may be arbitrarily selected.

As shown in FIG. 4, let a first imaginary plane P1 be the plane including the optical axis of the first light path and parallel to the recording surface of the optical disk 2, and a second imaginary plane P2 be the imaginary plane including the optical axis of the first light path and intersecting the first imaginary plane P1 at 45 degrees.

Figure 6:
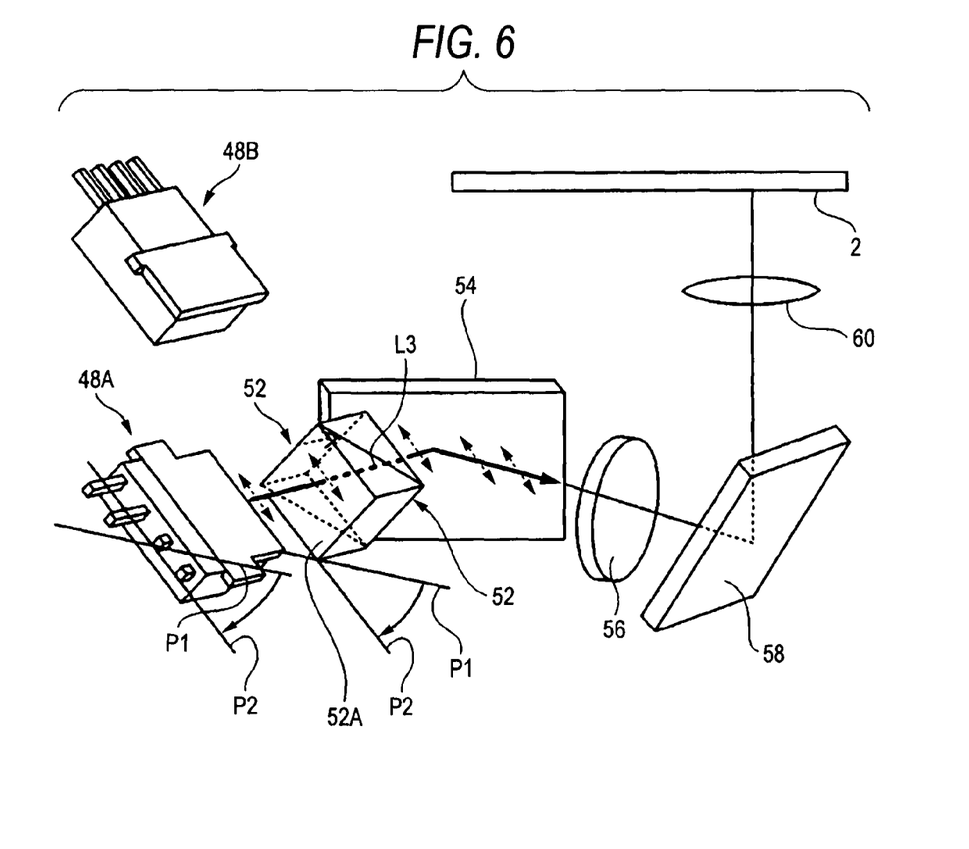
FIG. 6 explains the operation in the state in which a first light source 48A operates but a second light source 48B does not operate.

The first light source 48A is disposed in the region where the first imaginary plane P1 and the second imaginary plane P2 intersect. The first light source 48A is disposed in such a way that the optical axis of the first light path extends along the line where the first and second imaginary planes P1 and P2 intersect and the polarization direction of the first light beam from the first light source 48A is parallel to the second imaginary plane P2, as shown in FIG. 6.

Figure 7:
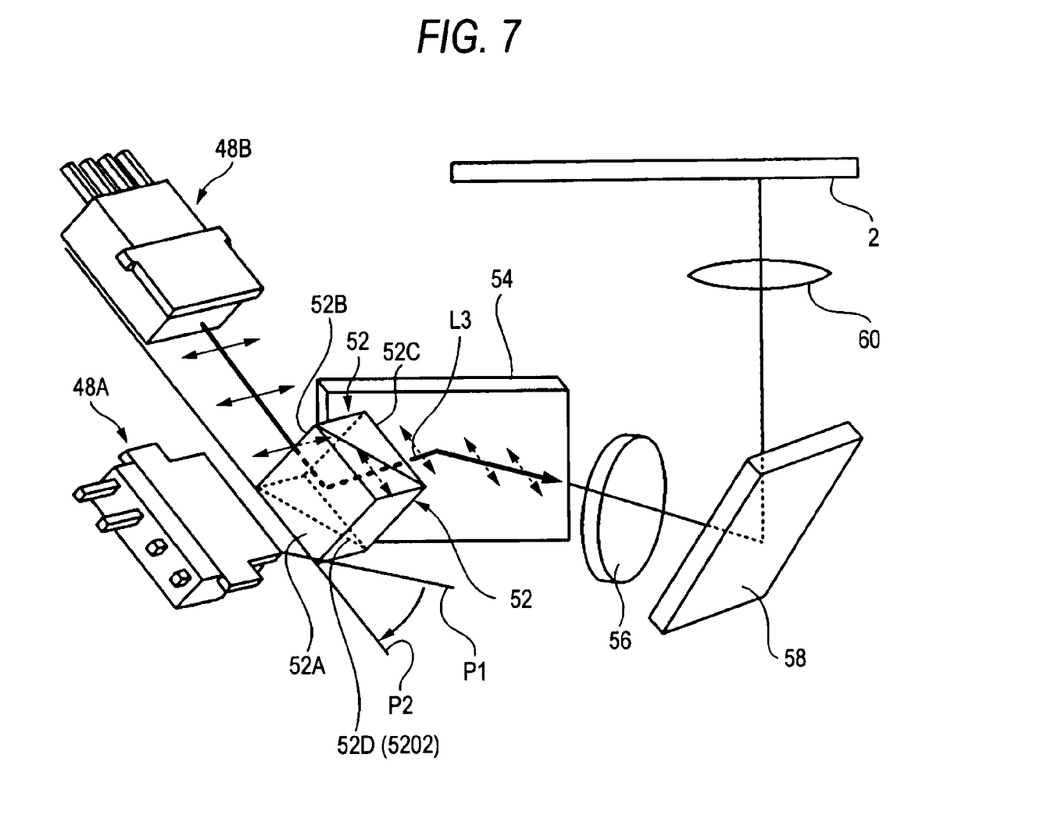
FIG. 7 explains the operation in the state in which the first light source 48A does not operate but the second light source 48B operates.

The second light source 48B is disposed in the second imaginary plane P2. The second light source 48B is disposed in such a way that the optical axis of the second light path extends along the second imaginary plane P2 and the polarization direction of the light beam from the second light source 48B is parallel to the second imaginary plane P2, as shown in FIG. 7.

In other words, the portion of the second light path along which the second light beam emitted from the second light source 48B travels to the dichroic prism 52 extends in the second imaginary plane P2, and hence the portion of the second light path intersects the first imaginary plane P1, specifically at 45 degrees in this embodiment.

The second light source 48B is disposed along a line perpendicular to the first imaginary plane P1 between the first imaginary plane P1 and the optical disk 2.

The first diffraction grating 50A diffracts the first light beam emitted from the first light source 48A to produce a plurality of light beams, for example, one primary beam and two secondary beams.

The second diffraction grating 50B diffracts the second light beam emitted from the second light source 48B to produce a plurality of light beams, for example, one primary beam and two secondary beams.

The first diffraction grating 50A is disposed along the first light path downstream of the first light source 48A, and the second diffraction grating 50B is disposed along the second light path downstream of the second light source 48B.

In other words, the first diffraction grating 50A is disposed in the first imaginary plane P1, and the second diffraction grating 50B is disposed in the second imaginary plane P2.

Therefore, the second diffraction grating 50B is disposed along a line perpendicular to the first imaginary plane P1 between the first imaginary plane P1 and the optical disk 2.

Various known diffraction gratings of related art can be used as the diffraction gratings 50A and 50B.

The first and second diffraction gratings 50A and 50B are provided in correspondence to how to generate the tracking error signal and the focus error signal, and can be omitted depending on how to generate the tracking error signal and the focus error signal.

The dichroic prism 52 is disposed in the first imaginary plane P1.

The dichroic prism 52 forms the light path-combining optical element for guiding the first light beam from the first light source 48A and the second light beam from the second light source 48B along a single light path to the optical disk 2, as shown in FIGS. 3, 6, and 7.

As shown in FIGS. 6 and 7, in this embodiment, the dichroic prism 52 is formed by bonding two rectangular prisms having the same shape and size into a cube. The dichroic prism 52 includes a thin film 5202 that reflects light of particular wavelength and transmits light of the other wavelengths.

In this embodiment, the thin film 5202 transmits the first light beam from the first light source 48A and reflects the second light beam from the second light source 48B.

Specifically, as shown in FIG. 6, the dichroic prism 52 includes a first incident surface 52A on which the light beam from the first light source 48A is incident, a second incident surface 52B which is perpendicular to the first incident surface 52A and on which the light beam from the second light source 48B is incident, an exit surface 52C which faces the second incident surface 52B and from which the above light beams exits, a bonded surface between the two rectangular prisms, that is, a bonded surface 52D extending in the plane that intersects three surfaces, the first and second incident surfaces 52A and 52B and the exit surface 52C, at 45 degrees, respectively. The thin film 5202 is formed on the bonded surface 52D and extends thereon. Therefore, the optical axis of the first light path intersects the optical axis of the second light path at the thin film 5202 at right angles.

P-polarized light and S-polarized light will now be described. Let an incident plane be the plain including a light ray and a normal to a plane on which the light ray is incident. P-polarized light is linearly polarized light having a polarization direction parallel to the incident plane, and S-polarized light is linearly polarized light having a polarization direction perpendicular to the incident plane.

That is, the thin film 5202 has the following optical characteristics:

When a linearly polarized light beam incident on the thin film 5202 is P-polarized or S-polarized light, no phase difference will be imparted to the light beam passing through or reflected off the thin film 5202, and hence the light beam passing through or reflected off the thin film 5202 exits through the dichroic prism 52 as the same linearly polarized light.

On the other hand, when the polarization direction of a linearly polarized light beam incident on the thin film 5202 has an angle between the angles of the polarization directions of P-polarized and S-polarized light, a phase difference will be imparted to the light beam passing through or reflected off the thin film 5202, and hence the light beam passing through or reflected off the thin film 5202 is converted into elliptically polarized light and exits through the dichroic prism 52.

An optical element characterized by an ability to impart phase difference to the light passing through or reflected off the optical element, such as the dichroic prism 52, is hereinafter referred to as an optical element having P-S phase difference.

Therefore, in this embodiment, the dichroic prism 52 has P-S phase difference. It is noted, however as described above, that when a linearly polarized light beam incident on the thin film 5202 is P-polarized or S-polarized light, the light beam passing through or reflected off the thin film 5202 maintains its linearly polarized state although the thin film 5202 has the P-S phase difference.

On the other hand, when the polarization direction of a linearly polarized light beam incident on the thin film 5202 has an angle between the angles of the polarization directions of P-polarized and S-polarized light, a phase different is imparted to the light beam passing through or reflected off the thin film 5202 according to the P-S phase difference, and hence the light beam is converted into elliptically polarized light.

Further, in this embodiment, the first and second light source 48A and 48B and the dichroic prism 52 are disposed in such a way that the first light beam incident on the thin film 5202 via the first light path and the second light beam incident on the thin film 5202 via the second light path are P-polarized light beams.

The beam splitter plate 54 is disposed along the third light path between the dichroic prism 52 and the optical disk 2. In other words, the beam splitter plate 54 is disposed between the dichroic prism 52 and the phase shifting mirror 58.

In this embodiment, the beam splitter plate 54 is disposed in the first imaginary plane P1.

The beam splitter plate 54, along with the phase shifting mirror 58, which will be described later, forms an optical isolator that separates the light path (outgoing path) that guides the light beams from the light sources 48A and 48B to the optical disk 2 via the third light path from the light path (return path) that guides the light beam reflected off the optical disk 2 to the PDIC 62.

In other words, the first or second light beam reflected off the optical disk 2 travels along the portion of the third light path that extends from the optical disk 2 to the beam splitter plate 54, passes through the beam splitter plate 54, and is guided along a fourth light path to the PDIC 62.

As shown in FIG. 3, the portion of the first light path L1 that extends from the first light source 48A to the beam splitter plate 54 and the fourth light path are located in the first imaginary plane P1 (in the same plane).

The beam splitter plate 54 has a thin film 54B formed on the surface of a transparent glass substrate 54A as shown in FIG. 3, the thin film 54B formed of a dielectric multilayer film or a metal thin film. The thin film 54B forms a light path-separating optical element that reflects light with predetermined reflectance and transmits light with predetermined transmittance.

In this embodiment, the beam splitter plate 54 presents different reflectance and transmittance values corresponding to the polarization direction of linearly polarized light incident thereon.

In this embodiment, the beam splitter plate 54 is disposed in such a way that the polarization direction of the first light beam incident on the thin film 54B via the third light path and the polarization direction of the second light beam incident on the thin film 54B via the third light path are inclined by 45 degrees, which is an intermediate angle between the angles of the polarization directions of P-polarized and S-polarized light.

The reflectance and transmittance of the thin film 54B on the beam splitter plate 54 will be described in detail.

The reflectance and transmittance of the thin film 54B are set as follows:
Reflectance for P-polarized light: Rp
Reflectance for S-polarized light: Rs (>Rp)
Transmittance for P-polarized light: Tp
Transmittance for S-polarized light: Ts (<Tp)

Therefore, the thin film 54B transmits the majority of P-polarized light and reflects part thereof, while reflecting the majority of S-polarized light and transmitting part thereof.

On the other hand, let Rx and Tx be the reflectance and the transmittance for linearly polarized light incident on the thin film 54B, the linearly polarized light having a polarization angle between the polarization angles of P-polarized and S-polarized light, for example, 45 degrees. The reflectance Rx and the transmittance Tx are approximated as follows:
The reflectance Rx is the average of the reflectance Rp and the reflectance Rs: $((Rp+Rs)/2)$
The transmittance Tx is the average of the transmittance Tp and the transmittance Ts: $((Tp+Ts)/2)$ The following shows exemplary reflectance and transmittance values in this embodiment.
Rp=77%
Rs=87%
Tp=21.5%
Ts=11.5%
Rx=82%
Tx=16.5%

That is, when a light beam having a polarization angle between the polarization angles of P-polarized and S-polarized light is incident on the thin film 54B, 82% of the light beam is reflected off the thin film 54B, and 16.5% of the light beam passes through the thin film 54B.

It is noted that the reflectance Rp and Rs and the transmittance Tp and Ts of the thin film 54B are arbitrarily set according to the design.

The collimator lens 56 is disposed in the first imaginary plane P1 along the third light path between the beam splitter plate 54 and the phase shifting mirror 58.

The collimator lens 56 collimates the first and second light beams that have been emitted from the first and second light sources 48A and 48B and entered the collimator lens 56 via the dichroic prism 52 and the beam splitter plate 54 and directs them to the objective lens 60 via the phase shifting mirror 58. The collimator lens 56 also converts the reflected light beam (first or second light beam) reflected off the optical disk 2 and guided via the objective lens 60 and the phase shifting mirror 58 into convergent light and directs it to the PDIC 62 via the beam splitter plate 54.

The phase shifting mirror 58 forms a phase difference-imparting optical element that imparts a predetermined phase difference to the first and second light beams. The phase shifting mirror 58 is disposed downstream of the collimator lens 56 along the third light path in the first imaginary plane P1.

In other words, the phase shifting mirror 58 is disposed along the third light path between the beam splitter plate 54 and the optical disk 2.

The phase shifting mirror 58 is disposed at a position where the optical axis of the collimator lens 56 intersects the optical axis of the objective lens 60 at right angles. In other words, the phase shifting mirror 58 is inclined to the optical axis of the collimator 56 by 45 degrees and oriented upward (toward the objective lens 60).

The phase shifting mirror 58 includes a transparent glass substrate 58A and a reflective film 58B formed on the backside of the glass substrate 58A.

The reflective film 58B has a function of imparting the phase difference corresponding to a quarter of the wavelength to a linearly polarized light beam incident on the reflective film 58B and reflecting the resultant light beam.

Specifically, when the polarization direction of linearly polarized light incident on the reflective film 58B has a predetermined angle that is an intermediate angle between the angles of the polarization directions of P-polarized and S-polarized light, the predetermined angle being 45 degrees in this embodiment, the reflective film 58B imparts the phase difference corresponding to a quarter of the wavelength to the linearly polarized light beam incident on the reflective film 58B so as to convert the incident linearly polarized light into circularly polarized light, and then reflects the resultant light beam. The reflected circularly polarized light is applied to the optical disk 2 through the objective lens 60, which will be described later.

In this embodiment, the phase shifting mirror 58 is disposed in such a way that the polarization direction of the light beam reflected off the beam splitter plate 54 has a predetermined angle (45 degrees in this embodiment) that is an intermediate angle between the angles of the polarization directions of P-polarized and S-polarized light.

When the polarization direction of the linearly polarized light incident on the reflective film 58B is deviated from the predetermined intermediate angle, the reflective film 58B imparts a phase difference deviated from the phase difference corresponding to a quarter of the wavelength to the linearly polarized light beam incident on the reflective film 58B, so that the incident linearly polarized light is converted into elliptically polarized light instead of circularly polarized light and then reflected.

Further, the reflective film 58B imparts the phase difference corresponding to a quarter of the wavelength to the circularly polarized light beam, which is the reflected light beam that have been reflected off the optical disk 2 and incident on the reflective film 58B through the objective lens 60, which will be described later, so as to convert the incident circularly polarized light into linearly polarized light, and then reflects and directs the resultant light beam to the collimator lens 56.

In this case, since the reflective film 58B imparts the phase difference corresponding to a quarter of the wavelength, the polarization angle of the linearly polarized light beam reflected off the reflective film 58B and directed to the collimator lens 56 (reflected light beam) is 90 degrees apart from the polarization angle of the linearly polarized light beam incident on the reflective film 58B via the collimator lens 56.

The reflective film 58B are arbitrarily configured, for example, formed of a phase shifting film that imparts phase difference and a total reflection film that reflects light. As the phase shifting mirror 58, any of various known phase shifting mirrors 58 of related art can be used as long as it has a function of imparting the phase difference corresponding to a quarter of the wavelength to an incident linearly polarized light beam before reflecting it and imparting the phase difference corresponding to a quarter of the wavelength to an incident circularly polarized light beam before reflecting it.

The objective lens 60 applies the first and second light beams to the recording surface of the optical disk 2, and is disposed along the third light path between the phase shifting mirror 58 and the recording surface of the optical disk 2.

Therefore, the objective lens 60 is disposed between the first imaginary plane P1 and the optical disk 2 along a line perpendicular to the first imaginary plane P1.

That is, the objective lens 60 focuses the circularly polarized light beam incident thereon via the phase shifting mirror 58 to form a spot corresponding to the light beam, and directs the circularly polarized reflected light beam reflected off the recording surface of the optical disk 2 to the phase shifting mirror 58.

The PDIC 62 is disposed along the fourth light path in the first imaginary plane P1.

The PDIC 62 receives the reflected light beam reflected off the optical disk 2 and the phase shifting mirror 58 and guided through the collimator lens 56 and the beam splitter plate 54 to produce a light reception signal. The PDIC 62 includes a light receiving element and an electric circuit that amplifies or computes a detection signal outputted from the light receiving element.

In FIG. 3, reference numeral 64 denotes a front power-monitoring, light receiving element that receives the light beams emitted from the first and second light sources 48A and 48B and passing through the beam splitter plate 54 and monitors the output intensities of the first and second light sources 48A and 48B.

The light receiving element 64 is disposed in the first imaginary plane P1.

The detection signal obtained from the light receiving element 64 is fed back to the laser control unit 36 and used to control and drive the first and second light sources 48A and 48B.

The operation of the optical system 15 will now be described.

First, a description will be made of the case where the first light source 48A operates but the second light source 48B does not operate.

As shown in FIGS. 3 to 5 and 6, the first linearly polarized light beam emitted from the first light source 48A passes through the first diffraction grating 50A via the first light path, passes through the thin film 5202 in the dichroic prism 52, reaches the beam splitter plate 54 via the third light path, and is reflected off the thin film 54B thereon.

Since the polarization direction of the first light beam incident on the thin film 54B is inclined by 45 degrees, which is an intermediate angle between the angles of the polarization directions of P-polarized and S-polarized light, the light beam will be reflected with the reflectance Rx described above.

The angle of the polarization direction of the first light beam incident on the thin film 54B is maintained, so that the angle of the polarization direction of the first light beam reflected off the thin film 54B is the same as that of the first light beam incident on the thin film 54B.

The first light beam reflected off the thin film 54B passes through the collimator lens 56 and is reflected off the phase shifting mirror 58.

Since the angle of the polarization direction of the first light beam is maintained at 45 degrees, the phase shifting mirror 58 imparts the phase difference exactly corresponding to a quarter of the wavelength to the first light beam, so that the first light beam is converted into circularly polarized light.

The first light beam that has been converted into circularly polarized light is applied to the optical disk 2 through the objective lens 60, and the reflected light beam (first light beam) reflected off the optical disk 2, which is still circularly polarized, is again reflected off the phase shifting mirror 58.

In this process, the phase shifting mirror 58 imparts the phase difference corresponding to a quarter of the wavelength to the reflected light beam, so that the reflected light beam is converted into a linearly polarized, reflected light beam having a polarization direction 90 degrees apart from the polarization direction of the linearly polarized light incident on the phase shifting mirror 58 (polarization direction of the linearly polarized light emitted from the first light source 48A).

The reflected light beam passes through the collimator lens 56, reaches the beam splitter plate 54, and passes through the thin film 54B thereon.

Since the polarization direction of the reflected light beam incident on the thin film 54B is inclined by an intermediate angle between the angles of the polarization directions of P-polarized and S-polarized light, the reflected light beam passes through the thin film 54B with the transmittance Tx described above.

The reflected light beam that has passed through the thin film 54B travels along the fourth light path to the PDIC 62, which then outputs a detection signal.

Part of the reflected light beam incident on the thin film 54B is reflected off the thin film 54B with the reflectance Rx, and returns through the dichroic prism 52 to the first light source 48A as return light.

However, since the reflected light beam, when reflected off the phase shifting mirror 58, has become linearly polarized light having a polarization direction 90 degrees apart from the polarization direction of the linearly polarized light emitted from the first light source 48A, noise generated by the return light will be effectively reduced.

Next, a description will be made of the case where the first light source 48A does not operate but the second light source 48B operates.

As shown in FIGS. 3 to 5 and 7, the second linearly polarized light beam emitted from the second light source 48B passes through the second diffraction grating 50B via the second light path, is reflected off the thin film 5202 in the dichroic prism 52, reaches the beam splitter plate 54 via the third light path, and is reflected off the thin film 54B thereon.

Since the polarization direction of the second light beam incident on the thin film 54B is inclined by 45 degrees, which is an intermediate angle between the angles of the polarization directions of P-polarized and S-polarized light, the second light beam will be reflected with the reflectance Rx described above.

The angle of the polarization direction of the second light beam incident on the thin film 54B is maintained, so that the angle of the polarization direction of the second light beam reflected off the thin film 54B is the same as that of the second light beam incident on the thin film 54B.

The second light beam reflected off the thin film 54B passes through the collimator lens 56 and is reflected off the phase shifting mirror 58.

Since the angle of the polarization direction of the second light beam is maintained at 45 degrees, the phase shifting mirror 58 imparts the phase difference exactly corresponding to a quarter of the wavelength to the light beam, so that the light beam is converted into circularly polarized light.

The second light beam that has been converted into circularly polarized light is applied to the optical disk 2 through the objective lens 60, and the reflected light beam (second light beam) reflected off the optical disk 2, which is still circularly polarized, is again reflected off the phase shifting mirror 58.

In this process, the phase shifting mirror 58 imparts the phase difference corresponding to a quarter of the wavelength to the reflected light beam, so that the reflected light beam is converted into a linearly polarized, reflected light beam having a polarization direction 90 degrees apart from the polarization direction of the linearly polarized light incident on the phase shifting mirror 58 (polarization direction of the linearly polarized light emitted from the second light source 48B).

The reflected light beam passes through the collimator lens 56, reaches the beam splitter plate 54, and passes through the thin film 54B thereon.

Since the polarization direction of the reflected light beam incident on the thin film 54B is inclined by an intermediate angle between the angles of the polarization directions of P-polarized and S-polarized light, the reflected light beam passes through the thin film 54B with the transmittance Tx described above.

The reflected light beam that has passed through the thin film 54B travels along the fourth light path to the PDIC 62, which then outputs a detection signal.

Part of the reflected light beam incident on the thin film 54B is reflected off the thin film 54B with the reflectance Rx, and returns through the dichroic prism 52 to the second light source 48B as return light.

However, as in the case described above, since the reflected light beam, when reflected off the phase shifting mirror 58, has become linearly polarized light having a polarization direction 90 degrees apart from the polarization direction of the linearly polarized light emitted from the second light source 48B, noise generated by the return light will be effectively reduced.

As described above, this embodiment provides the following advantages:

Since the first and second light beams emitted from the first and second light sources 48A and 48B, the first and second light beams having wavelengths different from each other, are P-polarized with respect to the thin film 5202 in the dichroic prism 52, no phase difference is imparted to the light beam passing through or reflected off the thin film 5202. Therefore, the phase shifting mirror 58 reliably performs linear-to-circular and circular-to-linear polarization conversion, so that the polarization direction of each of the light beams emitted from the light sources is reliably 90 degrees apart from the polarization direction of the return light.

It is therefore possible to effectively reduce return light-induced noise generated in the first and second light sources 48A and 48B by the return light to the first and second light sources 48A and 48B. Such reduction is advantageous in improving the performance of the optical pickup 14.

When the phase shifting mirror 58 is used to impart the phase difference corresponding to a quarter of the wavelength to the first and second light beams, as compared to the case where a quarter-wave plate is used, deviation of the polarization direction of the linearly polarized light beam incident on the phase shifting mirror 58 from a predetermined angle (45 degrees) strongly tends to affect the linear-to-circular polarization conversion performed by the phase shifting mirror 58 and result in elliptically polarized light due to the optical characteristics of the phase shifting mirror 58.

However, in this embodiment, since each of the first and second light beams emitted from the first and second light sources 48A and 48B is P-polarized with respect to the thin film 5202 in the dichroic prism 52, and hence no phase difference is imparted to the light beam that exits through the dichroic prism 52, the phase shifting mirror 58 can be used without producing such elliptically polarized light. That is, only one phase shifting mirror 58 is necessary instead of two parts, an upward-folding mirror for directing the first and second light beams to the objective lens 60 and a quarter-wave plate. Such configuration is advantageous in reducing the number of parts and hence cost and size.

In this embodiment, the first and second light beams reflected off the optical disk 2 travel along the portion of the third light path that extends from the optical disk 2 to the beam splitter plate 54. After passing through the beam splitter plate 54, the first and second light beams are guided along the fourth light path to the PDIC 62. The portion of first light path L1 that extends from the first light source 48A to the beam splitter plate 54 and the fourth light path L4 are located in the first imaginary plane P1, and the portion of the second light path along which the second light beam emitted from the second light source 48B travels to the dichroic prism 52 intersects the first imaginary plane P1.

Therefore, the second light source 48B can be separated in the direction perpendicular to the first imaginary plane P1 from the PDIC 62 disposed in the first imaginary plane P1. Such a configuration is advantageous in providing a degree of freedom in the layout of the PDIC 62 and the second light source 48B.

In particular, in the layout in which the second light source 48B and the PDIC 62 are disposed in the first imaginary plane P1, the distance between the second light source 48B and the PDIC 62 may not be sufficiently large due to the optical design. To avoid interference between the second light source 48B and the PDIC 62, the optical design is disadvantageously restricted.

In contrast, in this embodiment, there are no such optical design restrictions, which is advantageous in providing degrees of freedom both in optical design and layout of optical parts.

In this embodiment, as described above, the second light path intersects the first imaginary plane P1, and the second light source 48B is located closer to the optical disk 2 than the first light source 48A is, so that air flow generated when the optical disk 2 rotates impinges on the package 4802 and the connection terminals 4806 of the second light source 48B.

Since the air flow generated when the optical disk 2 rotates impinges on the package 4802 and the connection terminals 4806 of the second light source 48B, the second light source 48B can effectively cooled by the air flow. Such a configuration is advantageous in improving heat dissipation and stabilizing the operation of the second light source 48B.

Further, a heat sink, heat-dissipation grease and the like for cooling the second light source 48B can be omitted. Such a configuration is advantageous in reducing the part cost.

In this embodiment, the driver 45, which supplies a drive signal to the second light source 48B, is mounted on the substrate 44 disposed between the first light source 48A and the optical disk 2, and the second light path intersects the first imaginary plane P1 as described above, so that the second light source 48B is disposed in a region close to the driver 45.

Therefore, the distance of the wired portion including the flexible substrate 4810 that electrically connects the connection terminals 4806 of the second light source 48B to the driver 45 can be reduced and hence the electric resistance of the wired portion can be reduced. Such configuration is advantageous in efficiently transmitting the drive signal supplied from the driver 45 to the second light source 48B.

In particular, when a high-frequency signal is superimposed on the drive signal supplied from the driver 45 to the second light source 48B, the loss of the high-frequency signal can be reduced. Such reduction is advantageous in efficiently supplying the drive signal.

Second Embodiment

A second embodiment will be described below.

The second embodiment is similar to the first embodiment except the configuration and layout of the beam splitter plate. The following description will thus be made again with reference to FIGS. 3 to 7.

The beam splitter plate 54 is formed of a polarizing beam splitter that reflects one of P-polarized and S-polarized light and transmits the other.

In this embodiment, the beam splitter plate 54 reflects P-polarized light and transmits S-polarized light.

The reflectance and transmittance of the beam splitter plate 54 are therefore set as follows:
Reflectance for P-polarized light: Rp
Reflectance for S-polarized light: Rs (>>Rp)
Transmittance for P-polarized light: Tp
Transmittance for S-polarized light: Ts (<<Tp)

Further, the beam splitter plate 54 is disposed in such a way that each of the first and second light beams originating from the first and second light sources 48A and 48B and impinging on the beam splitter plate 54 via the dichroic prism 52 is one of P-polarized and S-polarized light and the reflected light beam (first or second light beam) incident on the beam splitter plate 54 via the phase shifting mirror 58 is the other one of P-polarized and S-polarized light.

In this embodiment, the beam splitter plate 54 is disposed in such a way that each of the first and second light beams is S-polarized light, and the reflected light beam (first or second light beam) incident on the beam splitter plate 54 via the phase shifting mirror 58 is P-polarized light.

Therefore, the majority of the first and second light beams originating from the first and second light sources 48A and 48B and impinging on the beam splitter plate 54 via the dichroic prism 52 is directed to the optical disk 2 via the collimator lens 56, the phase shifting mirror 58, and the objective lens 60.

Further the majority of the reflected light beam (first or second light beam) reflected off the optical disk 2 and impinging on the beam splitter plate 54 via the objective lens 60, the phase shifting mirror 58, and the collimator lens 56 is directed through the beam splitter plate 54 to the PDIC 62.

In such a configuration as well, advantageous effects similar to those in the first embodiment are, of course, provided. Such a configuration is also advantageous in providing sufficient transmittance for the reflected light beam when passing through the beam splitter plate 54, allowing a sufficient amount of reflected light to be directed to the PDIC 62.

The power consumed in the first and second light sources 48A and 48B can therefore be reduced. Such reduction is advantageous in reducing the amount of heat generated in the first and second light sources 48A and 48B. Further, a sufficient magnitude of detection signal can be produced in the PDIC 62, which is advantageous in improving the quality of the signal.

Although the second embodiment has been described with reference to the case where the beam splitter plate 54 reflects S-polarized light and transmits P-polarized light, the beam splitter plate 54 may, of course, reflects P-polarized light and transmits S-polarized light.

In this case, the reflectance and transmittance of the beam splitter plate 54 may be set as follows:
Reflectance for P-polarized light: Rp
Reflectance for S-polarized light: Rs (<<Rp)
Transmittance for P-polarized light: Tp
Transmittance for S-polarized light: Ts (>>Tp)

The embodiments described above have been described with reference to the case where the dichroic prism 52 is used as the light path-combining optical element.

As the light path-combining optical element, instead of using the dichroic prism 52, it is conceivable to use a dichroic mirror having a thin film formed on the surface of a transparent plate-like substrate, the thin film similar to the thin film 5202 in the dichroic prism 52.

As described above, the dichroic prism 52 is characterized by an ability to impart phase difference (P-S phase difference) to the light passing through or reflected off the dichroic prism 52 (thin film 5202). The P-S phase difference of the dichroic prism 52 is relatively greater than the P-S phase difference of the dichroic mirror. In other words, the dichroic mirror is more advantageous in terms of optical performance as the light path-combining optical element than the dichroic prism 52.

However, since the dichroic mirror has a plate-like outer shape, it is difficult to attach the dichroic mirror to the housing 46 with sufficient precision and hence the assembly and alignment becomes complicated. Such complicated assembly and alignment is disadvantageous in reducing manufacturing cost.

In contrast, since the dichroic prism 52 has a cubic outer shape, it is easy to attach the dichroic prism 52 to the housing 46 with sufficient precision and hence the assembly and alignment is simple. Such simple assembly and alignment is advantageous in reducing manufacturing cost.

That is, this embodiment provides an advantage of effectively reducing return light-induced noise generated in the first and second light sources while using the dichroic prism 52, which is advantageous in cost.

Although the above embodiments have been described with reference to the case where the first and second light beams incident on the light path-combining optical element are P-polarized light, the first and second light beams incident on the light path-combining optical element may be, of course, S-polarized light.

Further, although the above embodiments have been described with reference to the case where the beam splitter plate 54 is used as the light path-separating optical element, various known light path-separating optical elements of related art, such as a beam splitter prism, can be used as the light path-separating optical element.

Although the above embodiments have been described with reference to the case where the phase shifting mirror 58 is used as the phase difference-imparting optical element, various known phase difference-imparting optical elements of related art can be used as the phase difference-imparting optical element, such as a quarter-wave plate.

Further, the description has been made with reference to the case where the angle of the polarization direction of each of the first and second light beams incident on the phase difference-imparting optical element is 45 degrees, which is an intermediate angle between the angles of the polarization directions of the P-polarized and S-polarized light.

However, the angle of the polarization direction of each of the first and second light beams may be set according to the optical characteristics of the phase difference-imparting optical element, and may be set to any angle as long as the angle allows the linearly polarized light incident on the phase difference-imparting optical element to be accurately converted into circularly polarized light and the circularly polarized light incident on the phase difference-imparting optical element to be accurately converted into linearly polarized light. In other words, the angle of the polarization direction of each of the first and second light beams may be an angle that allows 90-degree phase difference to be accurately imparted to the light beam incident on the phase difference-imparting optical element.

Although the above embodiments have been described with reference to the case where the first light source 48A emits the first light beam having the first wavelength and the second light source 48B emits the second light beam having the second wavelength different from the first wavelength, the invention is, of course, applicable to the configuration in which one or both of the first and second light sources 48A and 48B can selectively emit two light beams having different wavelengths, that is, a so-called 1 can-2 wavelength configuration in which two laser diode chips are housed in a single package.

It should be understood by those skilled in the art that various modifications, combinations, sub-combinations and alterations may occur depending on design requirements and other factors insofar as they are within the scope of the appended claims or the equivalents thereof.

What is claimed is:

1. An optical pickup comprising:
a first light source that emits a first linearly polarized light beam having a first wavelength;
a second light source that emits a second linearly polarized light beam having a second wavelength different from the first wavelength;
a drive unit configured to selectively drive the first and second light sources;
a first light path along which the first light beam emitted from the first light source travels to an optical disk;
a second light path along which the second light beam emitted from the second light source travels to the optical disk,
the first and second light paths intersecting somewhere in the middle of the light paths and are combined into a third light path that extends from the intersection to the optical disk;
a light path-combining optical element provided at the intersection of the first and second light paths;
a light path-separating optical element provided along the third light path, the light path-separating optical element reflecting light with a predetermined reflectance and transmitting light with a predetermined transmittance;
a phase difference-imparting optical element provided along the third light path between the light path-separating optical element and the optical disk, the phase difference-imparting optical element imparting a predetermined phase difference to the first and second light beams; and
a light receiving element that receives the first and second light beams reflected off the optical disk, guided by the phase difference-imparting optical element, and transmitted through the light path-separating optical element,
the polarization direction of each of the first and second light beams incident on the phase difference-imparting optical element having an intermediate angle between the angles of the polarization directions of P-polarized and S-polarized light,
wherein the first and second light sources and the light path-combining optical element are located with respect to each other such that each of the first and second light beams incident on the light path-combining optical element is entirely P-polarized or S-polarized light.

2. The optical pickup according to claim 1, wherein the intersection angle between the optical axis of the portion of the first light path along which the first light beam emitted from the first light source travels to the light path-combining optical element and the optical axis of the portion of the second light path along which the second light beam emitted from the second light source travels to the light path-combining optical element is a right angle or any predetermined angle.

3. The optical pickup according to claim 1, wherein the first or second light beam reflected off the optical disk travels along the portion of the third light path that extends from the optical disk to the light path-separating optical element, passes through the light path-separating optical element, and is guided along a fourth light path to the light receiving element,
the portion of the first light path that extends from the first light source to the phase difference-imparting optical element and the fourth light path are located in the same plane, and
the portion of the second light path along which the second light beam emitted from the second light source travels to the light path-combining optical element intersects the plane.

4. The optical pickup according to claim 1, wherein the first or second light beam reflected off the optical disk travels along the portion of the third light path that extends from the optical disk to the light path-separating optical element, passes through the light path-separating optical element, and is guided along a fourth light path to the light receiving element,
the portion of the first light path that extends from the first light source to the phase difference-imparting optical element and the fourth light path are located in the same plane, and
the portion of the second light path along which the second light beam emitted from the second light source travels to the light path-combining optical element intersects the plane at 45 degrees.

5. The optical pickup according to claim 1, wherein the first or second light beam reflected off the optical disk travels along the portion of the third light path that extends from the optical disk to the light path-separating optical element, passes through the light path-separating optical element, and is guided along a fourth light path to the light receiving element, the portion of the first light path that extends from the first light source to the phase difference-imparting optical element and the fourth light path are located in the same plane, the portion of the second light path along which the second light beam emitted from the second light source travels to the light path-combining optical element intersects the plane, and the second light source is located closer to the optical disk than the first light source is.

6. The optical pickup according to claim 5, wherein the second light source includes a laser diode chip and a package that houses and holds the chip, and the package is disposed in a region where air flow generated when the optical disk rotates impinges.

7. The optical pickup according to claim 5, wherein the second light source includes a laser diode chip, a package that houses and holds the chip, and connection terminals provided on the package, the connection terminals supplying control signals to the chip, and the package and the connection terminals are disposed in a region where air flow generated when the optical disk rotates impinges.

8. The optical pickup according to claim 5, wherein the drive unit includes a driver that supplies a drive signal to the second light source, and the driver is mounted on a substrate disposed between the first light source and the optical disk.

9. The optical pickup according to claim 1, wherein the light path-combining optical element is formed of a dichroic prism.

10. The optical pickup according to claim 1, wherein the light path-separating optical element is formed of a beam splitter plate or a beam splitter prism.

11. The optical pickup according to claim 1, wherein the phase difference-imparting optical element is formed of a phase shifting mirror or a quarter-wave plate.

12. The optical pickup according to claim 1, wherein the light path-separating optical element is formed of a polarizing beam splitter that reflects one of P-polarized and S-polarized light and transmits the other, and the light path-separating optical element is disposed in such a way that each of the first and second light beams incident on the light path-separating optical element via the light path-combining optical element is one of P-polarized and S-polarized light and each of the first and second light beams incident on the light path-separating optical element via the phase difference-imparting optical element is the other one of P-polarized and S-polarized light.

13. An optical disk apparatus comprising:

a drive unit configured to hold and rotate an optical disk; and an optical pickup that applies recording and/or reproducing light beams to the optical disk rotated by the drive unit and detecting a reflected light beam reflected off the optical disk, wherein the optical pickup includes a first light source that emits a first linearly polarized light beam having a first wavelength, a second light source that emits a second linearly polarized light beam having a second wavelength different from the first wavelength, a drive unit configured to selectively drive the first and second light sources, a first light path along which the first light beam emitted from the first light source travels to the optical disk, a second light path along which the second light beam emitted from the second light source travels to the optical disk, the first and second light paths intersecting somewhere in the middle of the light paths and are combined into a third light path that extends from the intersection to the optical disk, a light path-combining optical element provided at the intersection of the first and second light paths, a light path-separating optical element provided along the third light path, the light path-separating optical element reflecting light with a predetermined reflectance and transmitting light with a predetermined transmittance, a phase difference-imparting optical element provided along the third light path between the light path-separating optical element and the optical disk, the phase difference-imparting optical element imparting a predetermined phase difference to the first and second light beams, and a light receiving element that receives the first and second light beams reflected off the optical disk, guided by the phase difference-imparting optical element, and transmitted through the light path-separating optical element, the polarization direction of each of the first and second light beams incident on the phase difference-imparting optical element having an intermediate angle between the angles of the polarization directions of P-polarized and S-polarized light, and the first and second light sources and the light path-combining optical element located with respect to each other such that each of the first and second light beams incident on the light path-combining optical element is entirely P-polarized or S-polarized light.

* * * * *